US009988052B2

(12) United States Patent
Tsuruta et al.

(10) Patent No.: US 9,988,052 B2
(45) Date of Patent: Jun. 5, 2018

(54) VEHICLE PROVIDED WITH CONTINUOUSLY VARIABLE TRANSMISSION DEVICE

(71) Applicant: TOYOTA JIDOSHA KABUSHIKI KAISHA, Toyota-shi, Aichi-ken (JP)

(72) Inventors: Yoshiaki Tsuruta, Nagakute (JP); Masayuki Baba, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 19 days.

(21) Appl. No.: 15/110,530

(22) PCT Filed: Dec. 30, 2014

(86) PCT No.: PCT/IB2014/002899
§ 371 (c)(1),
(2) Date: Jul. 8, 2016

(87) PCT Pub. No.: WO2015/107381
PCT Pub. Date: Jul. 23, 2015

(65) Prior Publication Data
US 2016/0325747 A1 Nov. 10, 2016

(30) Foreign Application Priority Data
Jan. 15, 2014 (JP) .................................. 2014-004901

(51) Int. Cl.
*B60W 30/182* (2012.01)
*B60W 20/00* (2016.01)
(Continued)

(52) U.S. Cl.
CPC ........... *B60W 30/182* (2013.01); *B60K 6/543* (2013.01); *B60W 10/06* (2013.01); *B60W 10/08* (2013.01);
(Continued)

(58) Field of Classification Search
CPC .... B60W 30/182; B60W 20/00; B60W 10/08; B60W 10/06; B60K 6/543;
(Continued)

(56) References Cited

U.S. PATENT DOCUMENTS 5,123,389 A * 6/1992 Togai .................... F02D 11/105
123/336
6,390,949 B1 * 5/2002 Kondo .................... F16H 61/08
477/109
(Continued)

FOREIGN PATENT DOCUMENTS

| JP | 2002-243031 | 8/2002 |
|---|---|---|
| JP | 2007-10045 | 1/2007 |
| JP | 2012-180090 | 9/2012 |

*Primary Examiner* — Jaime Figueroa
(74) *Attorney, Agent, or Firm* — Finnegan, Henderson, Farabow, Garrett & Dunner LLP

(57) ABSTRACT

A vehicle is provided with a continuously variable transmission device and an electric control unit controlling an engine, a motor generator, and the continuously variable transmission device. The electric control unit selects any one of a plurality of operation modes, having different correlations between a driver's accelerator operation amount and a control throttle opening, to suit driver's requests, and performs a number-of-revolutions increase control for increasing an engine rotation speed according to at least one of elapsed time from a time point of a vehicle speed increase and elapsed time from a time point of an acceleration request in a case where the control throttle opening exceeds a predetermined threshold. The electric control unit controls the engine to suppress the engine rotation speed change due to a change of the operation mode in a case where the control throttle opening is changed across the predetermined threshold in response to the change of the operation mode.

7 Claims, 14 Drawing Sheets

(51) Int. Cl.
*F02D 41/00* (2006.01)
*B60K 6/543* (2007.10)
*B60W 10/06* (2006.01)
*B60W 10/08* (2006.01)
*F16H 61/662* (2006.01)
*F16H 61/66* (2006.01)

(52) U.S. Cl.
CPC ......... *B60W 20/00* (2013.01); *F02D 41/0002* (2013.01); *F16H 61/66259* (2013.01); *B60Y 2200/92* (2013.01); *B60Y 2300/182* (2013.01); *B60Y 2300/18025* (2013.01); *B60Y 2300/43* (2013.01); *B60Y 2300/52* (2013.01); *B60Y 2300/60* (2013.01); *F02D 2200/602* (2013.01); *F16H 2061/6602* (2013.01); *F16H 2061/6615* (2013.01); *Y10S 903/918* (2013.01); *Y10S 903/93* (2013.01)

(58) Field of Classification Search
CPC .......... F02D 41/0002; F02D 2200/602; F16H 61/66259; F16H 2061/6602; F16H 2061/6615; B60Y 2300/52; B60Y 2300/182; B60Y 2300/60; B60Y 2200/92; B60Y 2300/43; B60Y 2300/18025; Y10S 903/918; Y10S 903/93

USPC ...................................................... 701/1, 22
See application file for complete search history.

(56) References Cited

U.S. PATENT DOCUMENTS

| | | | | |
|---|---|---|---|---|
| 7,921,943 | B2* | 4/2011 | Ueoka | B60K 6/26 180/65.21 |
| 8,565,955 | B2* | 10/2013 | Oyama | B60K 6/365 180/65.275 |
| 2004/0002808 | A1* | 1/2004 | Hashimoto | F02D 11/107 701/107 |
| 2007/0004552 | A1 | 1/2007 | Matsudaira et al. | |
| 2008/0236912 | A1* | 10/2008 | Ueoka | B60K 6/26 180/65.265 |
| 2010/0138086 | A1* | 6/2010 | Imamura | B60K 6/445 701/22 |
| 2012/0101678 | A1* | 4/2012 | Oyama | B60K 6/365 701/22 |
| 2013/0325238 | A1* | 12/2013 | Kato | B60W 10/06 701/22 |
| 2015/0233304 | A1* | 8/2015 | Hara | F02D 9/02 701/22 |

* cited by examiner

<FLOWCHART SHOWING PROCESSING IN S1 IN DETAIL>

<FLOWCHART SHOWING PART (S2A) OF PROCESSING IN S2>

<ACCELERATION FEELING PRODUCTION CONTROL>

<FLOWCHART SHOWING ANOTHER PART (S3B) OF PROCESSING IN S3>

<FLOWCHART SHOWING PROCESSING IN S4 IN DETAIL>

VEHICLE PROVIDED WITH CONTINUOUSLY VARIABLE TRANSMISSION DEVICE

CROSS-REFERENCE TO RELATED APPLICATIONS

This application is a national phase application of International Application No. PCT/IB2014/002899, filed Dec. 30, 2014, and claims the priority of Japanese Application No. 2014-004901, filed Jan. 15, 2014, the content of both of which is incorporated herein by reference.

BACKGROUND OF THE INVENTION

1. Field of the Invention

The invention relates to a vehicle that is provided with a continuously variable transmission device and, more particularly, to a hybrid vehicle that is provided with a continuously variable transmission device.

2. Description of Related Art

Japanese Patent Application Publication No. 2002-243031 (JP 2002-243031 A) discloses a shift control device for an automatic transmission. The control device obtains a shift target value from an operational point that is determined by a throttle opening and a vehicle speed, and executes continuously variable gear ratio control for controlling an automatic transmission gear ratio.

Techniques for determining whether to perform fixed gear ratio control or optimum fuel efficiency control depending on whether a control throttle opening is equal to or higher than a predetermined threshold have been studied for a vehicle that is provided with a continuously variable transmission (hereinafter, also referred to as a "continuously variable transmission device").

Also, techniques for controlling a vehicle having a plurality of modes, such as a power mode and an eco mode, present for a relationship between the amount of an accelerator operation by a driver and a control throttle opening and allowing mode switch by the driver have been known.

A vehicle in which these controls are executed in combination is studied. The mode switch by the driver causes the relationship between the accelerator operation amount and the control throttle opening to be switched. Then, the control throttle opening is changed across a predetermined threshold by the mode switching operation, even if the amount of the accelerator operation by the driver is not changed. In this case, control switching may occur between the fixed gear ratio control and the optimum fuel efficiency control.

In this case, an engine rotation speed may fluctuate and the driver may feel a sense of discomfort if the control switching occurs between the fixed gear ratio control and the optimum fuel efficiency control in a state where the engine rotation speed of the fixed gear ratio control and the engine rotation speed of the optimum fuel efficiency control deviate from each other.

SUMMARY OF THE INVENTION

The invention, which has been made in view of the above, provides a vehicle that is provided with a continuously variable transmission device which suppresses a sense of discomfort of a driver during a mode switching operation.

The invention provides a vehicle traveling by using power of at least any one of an engine and a motor generator. The vehicle is provided with continuously variable transmission devices and an electronic control unit. The continuously variable transmission device are provided between the engine and drive wheels of the vehicle. The electronic control unit is configured to control the engine, the motor generator, and the continuously variable transmission device. The electronic control unit is configured to select any one of a plurality of operation modes to suit driver's requests, the plurality of operation modes having different correlations between a driver' accelerator operation amount for the vehicle and a control throttle opening of the vehicle. The electronic control unit is configured to perform a number-of-revolutions increase control for increasing an engine rotation speed according to one or each of passage of time from time points of a vehicle speed increase and an acceleration request, in a case where the control throttle opening exceeds a predetermined threshold. The electronic control unit is configured to control the engine so as to suppress a change in the engine rotation speed due to a change of the operation mode, in a case where the control throttle opening is changed across the predetermined threshold in response to the change of the operation mode.

According to the vehicle having the configuration described above, the sense of discomfort such as a sudden change in the engine rotation speed can be suppressed when the mode switching operation is performed by the driver in the vehicle which allows the execution of the number-of-revolutions increase control.

In this vehicle, the electronic control unit may be configured to execute a fuel efficiency-priority engine control for focusing on fuel efficiency improvement more than the number-of-revolutions increase control, in a case where the control throttle opening does not exceed the predetermined threshold. The electronic control unit may be configured to put control switching between the number-of-revolutions increase control and the fuel efficiency-priority engine control on hold, in a case where the control throttle opening is changed across the threshold in response to the change of the operation mode. The electronic control unit may be configured to execute the control switching when the engine rotation speed determined by the number-of-revolutions increase control and the engine rotation speed determined by the fuel efficiency-priority engine control are identical to each other, in a case where the control throttle opening is changed across the threshold in response to the change of the operation mode.

When the mode switching operation is performed by the driver in the vehicle allowing the execution of the number-of-revolutions increase control, the engine rotation speed can be smoothly changed, despite the mode change, according to the vehicle having the configuration described above since the switch is performed after a state where the engine rotation speed is not suddenly changed. In other words, the control switching between the number-of-revolutions increase control and the fuel efficiency-priority engine control can be performed without the driver feeling the sense of discomfort.

The plurality of operation modes may include a fuel efficiency-priority mode. The electronic control unit may be configured to select the engine rotation speed determined by the number-of-revolutions increase control as an engine rotation speed command value for the engine, in a case where the control throttle opening is changed across the predetermined threshold in response to the change of the operation mode to the fuel efficiency-priority mode in a state where the engine rotation speed during the execution of the number-of-revolutions increase control is lower than the engine rotation speed determined by the fuel efficiency-priority engine control.

For example, a normal mode and an eco mode in comparison to a power mode correspond to the fuel efficiency-priority mode and the eco mode in comparison to the normal mode corresponds to the fuel efficiency-priority mode. According to the vehicle having the configuration described above, the engine rotation speed change is suppressed and the driver can avoid the sense of discomfort in a case where the engine rotation speed may be suddenly increased by the mode switch by the driver to the fuel efficiency-priority mode.

The plurality of operation modes may include a fuel efficiency-priority mode. The electronic control unit may be configured to select the engine rotation speed determined by the fuel efficiency-priority engine control as an engine rotation speed command value for the engine, in a case where the control throttle opening is changed across the predetermined threshold by the cancel of the fuel efficiency-priority mode in a state where the engine rotation speed during the execution of the fuel efficiency-priority engine control is higher than the engine rotation speed determined by the number-of-revolutions increase control.

For example, the normal mode and the eco mode in comparison to the power mode correspond to the fuel efficiency-priority mode and the eco mode in comparison to the normal mode corresponds to the fuel efficiency-priority mode. According to the configuration described above, the engine rotation speed change is suppressed and the driver can avoid the sense of discomfort in a case where the engine rotation speed may be suddenly decreased by the mode switch by the driver for releasing the fuel efficiency-priority mode.

In the vehicle described above, the continuously variable transmission device may include another motor generator other than the motor generator. The electronic control unit may be configured to execute control for satisfying the power demand by power absorption or output by the another motor generator, in a case where an excess or a shortfall is produced with respect to a driver's power demand during the number-of-revolutions increase control.

According to the vehicle having the configuration described above, the driver's power demand can be satisfied by the power absorption or output by the another motor generator in a case where the excess or the shortfall is produced with respect to the driver's power demand during the number-of-revolutions increase control.

In the vehicle described above, each of the motor generator and the another motor generator may be provided with a temperature detection sensor. The electronic control unit may be configured to limit loads on the motor generator and the another motor generator when temperatures of the motor generator or the another motor generator detected by at least one of the temperature detection sensors exceeds a predetermined threshold temperature.

According to the vehicle having the configuration described above, the loads on the motor generator and the another motor generator are limited when the temperatures of the motor generator and the another motor generator exceed a predetermined threshold temperature, and thus overheating of the motor generator and the another motor generator can be suppressed.

According to the invention, the sense of discomfort of the driver attributable to the change in the engine rotation speed of the vehicle during the mode switching operation performed by the driver can be suppressed in the vehicle allowing the execution of the number-of-revolutions increase control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
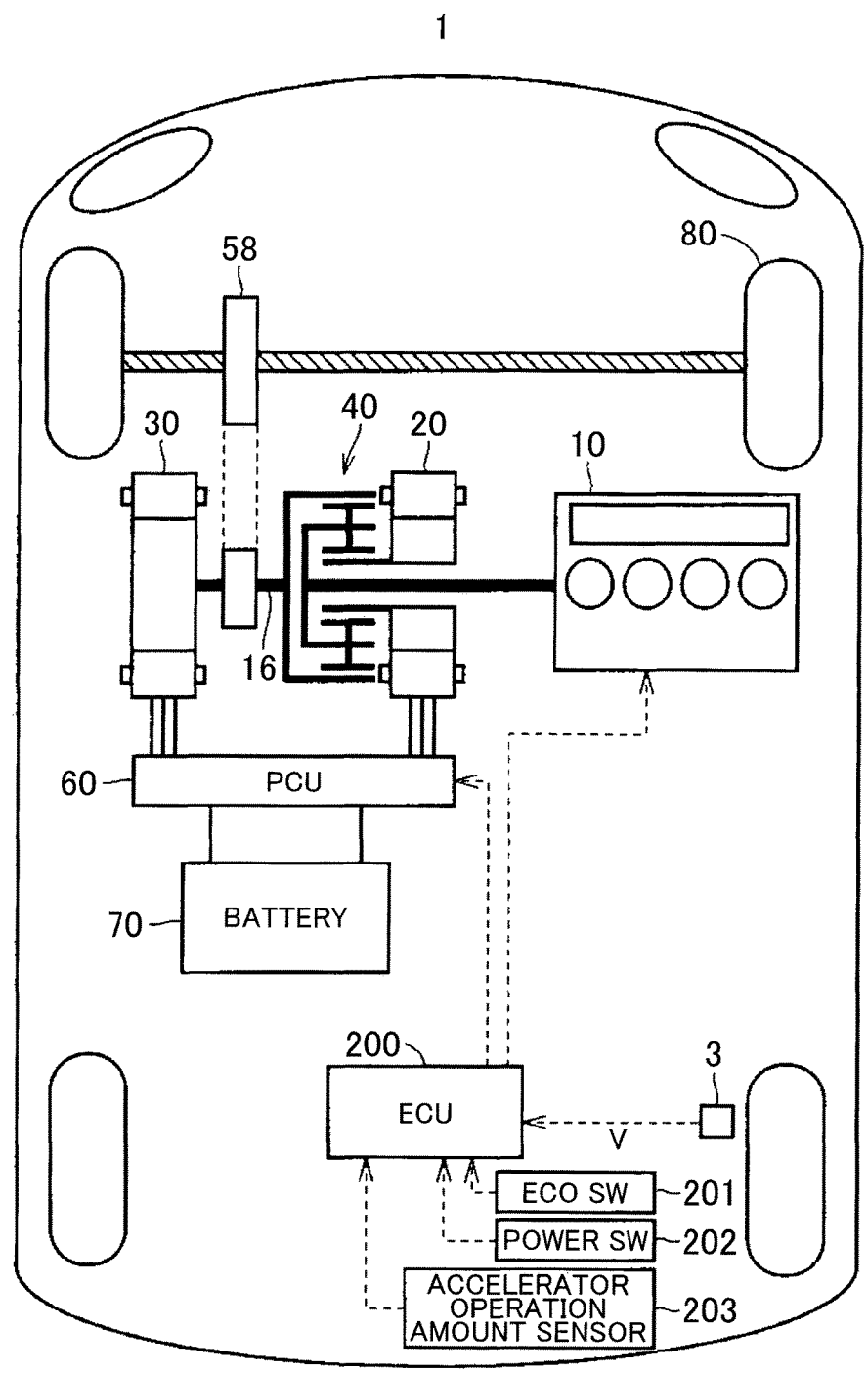
FIG. 1 is a diagram illustrating an overall configuration of a vehicle according to an embodiment.

Hereinafter, an embodiment of the invention will be described with reference to accompanying drawings. In the following description, the same reference numerals will be attached to the same components. This is the same regarding designations and functions thereof. Accordingly, detailed description thereof will not be repeated.

In this specification, the term of "electric power" means narrowly-defined electric power (power) in some cases and means broadly-defined electric power, which is energy (amount of work) or electric energy, in other cases. The term will be interpreted flexibly depending on situations in which the term is used.

An overall configuration of a vehicle will be described. FIG. 1 is a diagram illustrating an overall configuration of a vehicle 1 according to this embodiment. The vehicle 1 includes an engine 10, a drive shaft 16, a first motor generator (hereinafter, referred to as "MG1", the same applied hereinbelow) 20, a second motor generator (hereinafter, referred to as "MG2", the same applied hereinbelow) 30, a power splitting device 40, a decelerator 58, a power control unit (PCU) 60, a battery 70, drive wheels 80, an eco-switch 201, a power switch 202, an accelerator operation amount sensor 203, a vehicle speed sensor 3, and an electronic control unit (ECU) 200.

The vehicle 1 is a hybrid vehicle that is capable of traveling by using power of at least one of the engine 10 and the MG2 30.

The power that is generated by the engine 10 is split by the power splitting device 40 to a path of transmission to the drive shaft 16 (drive wheels 80) and a path of transmission to the MG1 20.

The MG1 20 and the MG2 30 are three-phase AC rotary electric machines that are driven by the PCU 60. The MG1 20 is capable of generating electric power by using the power of the engine 10 that is split by the power splitting device 40. The MG2 30 is capable of generating power by using at least any one of electric power that is stored on the battery 70 and the electric power that is generated by the MG1 20. The power that is generated by the MG2 30 is transmitted to the drive wheels 80 via the drive shaft 16. The MG2 30 also generates electric power by using rotational energy of the drive shaft 16, and thus functions also as a regenerative brake. The electric power that is generated by the MG2 30 charges the battery 70 through the PCU 60.

The power splitting device 40 is a planetary gear mechanism that includes a sun gear, a ring gear, a pinion, and a carrier. The sun gear is connected to the MG1 20. The ring gear is connected to the MG2 30 and the drive wheels 80 via the drive shaft 16. The pinion is engaged with each of the sun gear and the ring gear. The carrier supports the pinion to be rotatable and is connected to a crankshaft of the engine 10.

The engine 10, the MG1 20, and the MG2 30 are connected via the power splitting device 40 that has a planetary gear, and thus an engine rotation speed NE, an MG1 rotation speed NM1, and an MG2 rotation speed NM2 have a relationship of straight-line connection (relationship in which determination of any two of the values result in unique determination of the other value) in a nomogram of the power splitting device 40.

For example, the engine rotation speed NE is uniquely determined when the MG1 rotation speed NM1 and the MG2 rotation speed NM2 are determined. In other words, the engine rotation speed NE can be changed freely, even if the MG2 rotation speed NM2 is constant, by adjusting the first motor rotation speed NM1. Since the second motor 30 is connected to the drive wheels 80, the second motor rotation speed NM2 is a value corresponding to a vehicle speed V. Accordingly, a ratio of the engine rotation speed NE to the vehicle speed V can be steplessly switched when the first motor rotation speed NM1 is adjusted. In the vehicle 1, the first motor 20 and the power splitting device 40 function as an electric continuously variable transmission device that can steplessly switch the ratio of the engine rotation speed NE to the vehicle speed V. Vehicles to which the invention can be applied are not limited to vehicles that are provided with an electric continuously variable transmission device. The invention can also be applied to vehicles that are provided with a mechanical (for example, belt-type) continuously variable transmission.

The PCU 60 is an electric power conversion device that performs electric power conversion between the battery 70, the first motor 20, and the second motor 30 based on a control signal from the ECU 200.

The battery 70 is a rechargeable battery that is configured to include, for example, a nickel-hydrogen battery, a lithium-ion battery, and the like. The battery 70 has a voltage of, for example, approximately 200 V. As described above, the battery 70 is charged by using the electric power that is generated by the first motor 20 and/or the second motor 30. The battery 70 may be an electric storage device that is capable of inputting/outputting electric power between the first motor 20 and the second motor 30. For example, the battery 70 may be replaced with a large-capacity capacitor.

Figure 10:
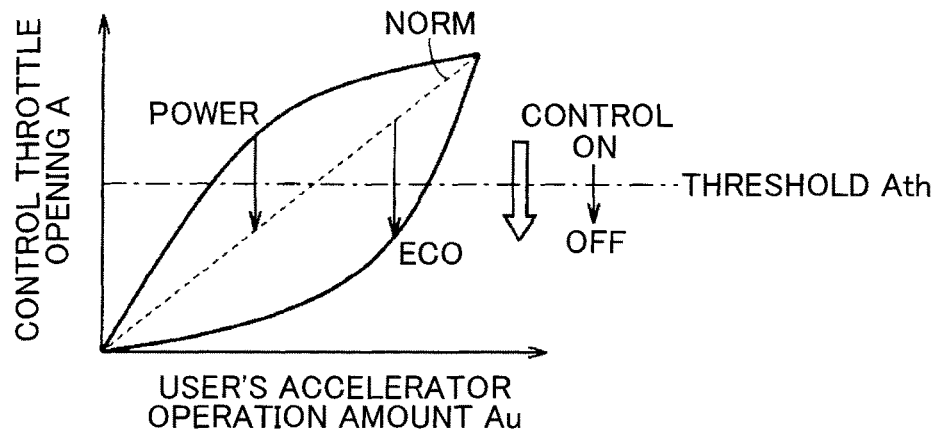
FIG. 10 is a diagram that is used to describe a state where a control throttle opening is changed to exceed a predetermined threshold and the acceleration feeling production control is canceled by an operation of a mode-switching switch according to this embodiment.

The accelerator operation amount sensor 203 detects an accelerator operation amount A (amount of accelerator pedal operation by a user), and transmits a result of the detection to the ECU 200. The vehicle speed sensor 3 detects the vehicle speed V (wheel speed can be used as the vehicle speed V or the vehicle speed V may be the second motor rotation speed NM2 or the like), and transmits a result of the detection to the ECU 200. The eco-switch 201 and the power switch 202 transmit an instruction for switching a relationship between the accelerator operation amount Au and a control throttle opening A as illustrated in FIG. 10 (described later) to the ECU 200.

A plurality of sensors (not illustrated) are disposed in the vehicle 1 so as to detect various physical quantities that are required to control the vehicle 1 such as the engine rotation speed NE, the first motor rotation speed NM1, the second motor rotation speed NM2, a temperature of the second motor 30, and a state (current, voltage, and temperature) of the battery 70. These sensors transmit results of the detection to the ECU 200.

The ECU 200 is an electronic control unit into which a central processing unit (CPU, not illustrated) and a memory are built. The ECU 200 executes predetermined computation processing based on information from the sensors and information stored on the memory, and controls each of equipment of the vehicle 1 based on a result of the computation. The ECU 200 controls a vehicle driving force by controlling the engine 10, the PCU 60, and the like.

A description of an optimum fuel efficiency control and an acceleration feeling production control will be described. In the hybrid vehicle, the engine is controlled to be operated at a high-efficiency operation point for fuel efficiency improvement. If the engine is controlled in this manner, the engine rotation speed reacts not very sensitively to the accelerator pedal operation by a user, an increase in the vehicle speed, and passage of accelerator-stepping time. Users have various preferences, and some of the users pursue acceleration feeling during the operation of the vehicle.

In the hybrid vehicle that is provided with the continuously variable transmission device, the acceleration feeling can be produced (the user can have the acceleration feeling) by increasing the engine rotation speed when an acceleration request is made by the user and the vehicle speed is increased. In this specification, the control described above will be referred to as number-of-revolutions increase control or acceleration feeling production control. When an engine output becomes short of or exceeds a vehicle power demand due to the production of the acceleration feeling, a motor output (powering power or regenerative power of the motor) can be adjusted so as to remove the excess or the shortfall.

Figure 2:
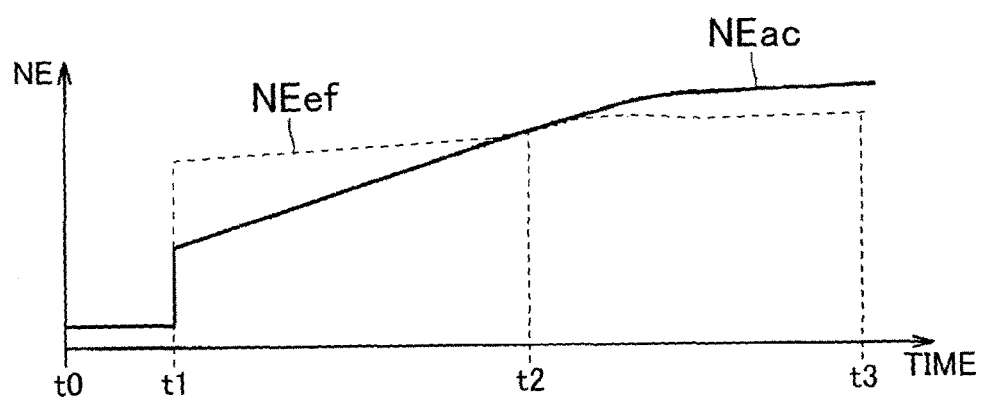
FIG. 2 is a waveform chart that is used to describe optimum fuel efficiency control and acceleration feeling production control for the vehicle.

FIG. 2 is a waveform chart that is used to describe the optimum fuel efficiency control and the acceleration feeling production control. The vertical axis in FIG. 2 represents the engine rotation speed NE, and the horizontal axis in FIG. 2 represents the elapsed time. The dashed line in FIG. 2 represents an engine rotation speed NEef in a case where the optimum fuel efficiency control is executed. The solid line in FIG. 2 represents an engine rotation speed NEac in a case where the acceleration feeling production control is executed.

At time t1, the number of revolutions of the engine rises as the accelerator pedal operation amount exceeds a predetermined threshold. If the acceleration feeling production control is executed in this case, the engine rotation speed NEac increases with time while the engine rotation speed NEac is controlled to have a higher rate of increase than the engine rotation speed NEef.

In this case, the user is likely to feel an engine sound change, and can feel more acceleration feeling from the vehicle speed and passage of time.

When the acceleration feeling production control is performed, the engine rotation speed NEac deviates from the optimum fuel efficiency rotation speed NEef at which the engine is capable of outputting the vehicle power demand with a maximum efficiency. The excess or shortfall of the engine output is corrected by the motor output.

From times t1 to t2, the engine output is short, the shortfall is compensated by the motor output, and battery discharge increases. From times t2 to t3, the engine output excess is regenerated by the motor and battery charging is performed.

Figure 3:
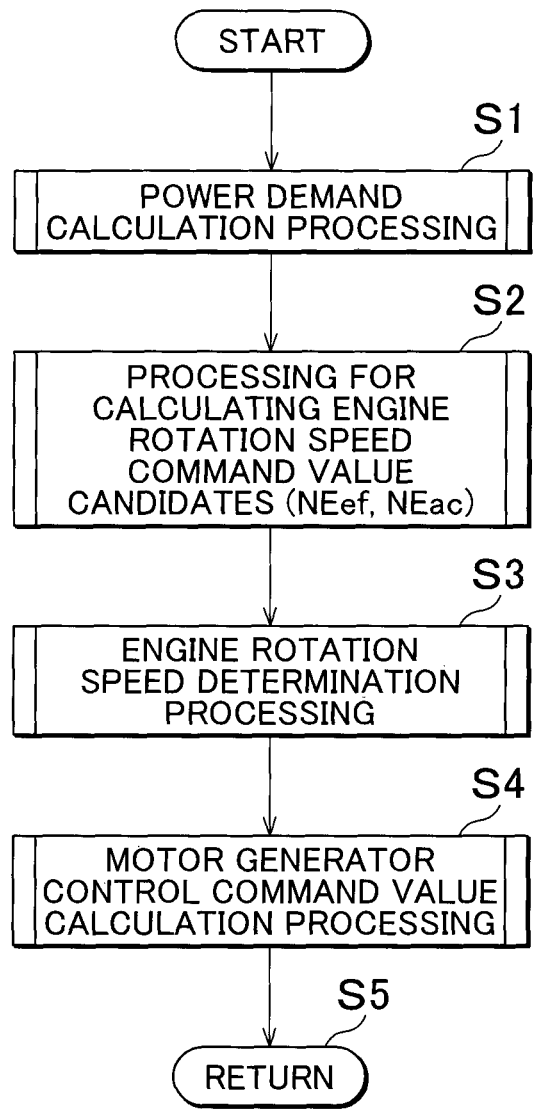
FIG. 3 is a flowchart illustrating a flow of processing that is executed in a case where an electronic control unit according to this embodiment controls a vehicle driving force.

The vehicle driving force control will be described. FIG. 3 is a flowchart illustrating a flow of processing that is executed in a case where the vehicle driving force is controlled by the ECU 200. This processing is executed with this flowchart being repeated at a predetermined computation cycle ΔT.

In Step S1, vehicle power demand calculation processing is executed. In Step S2, processing is performed for engine rotation speed command value candidate calculation. As engine rotation speed command value candidates, the engine rotation speed NEef during the execution of the optimum fuel efficiency control and the rotation speed NEac during the execution of the acceleration feeling production control are calculated.

In Step S3, processing is executed for engine rotation speed determination. In Step S3, any one of the rotation speed NEef and the rotation speed NEac is selected.

In Step S4, processing is executed for calculating a motor control command value that corresponds to the engine rotation speed which is determined in Step S3.

Figure 4:
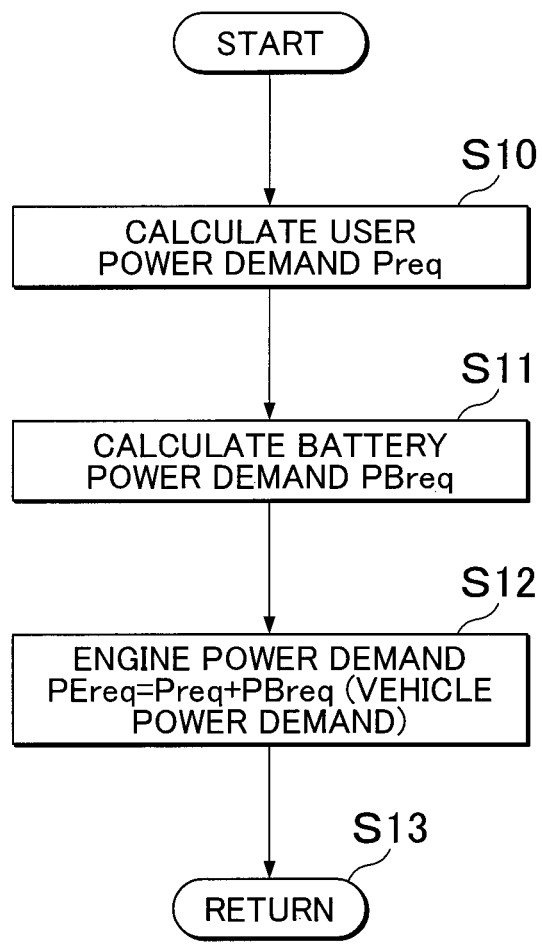
FIG. 4 is a flowchart illustrating the processing in Step S1 in FIG. 3 in detail.

FIG. 4 is a flowchart illustrating the processing in Step S1 in FIG. 3 in detail. Referring to FIGS. 1 and 4, the ECU 200 calculates a user-requested vehicle driving force (hereinafter, referred to as a "user power demand") Preq in Step S10 based on the control throttle opening A and the vehicle speed V.

In Step S11, the ECU 200 calculates power PBreq that is required for charging or discharging of the battery 70 (hereinafter, referred, to as a "battery power demand") based on an electric power storage amount of the battery 70 (hereinafter, also referred to as a "battery SOC"). In this embodiment, the battery power demand PBreq is a positive value in a case where the battery 70 has to be charged and is a negative value in a case where the battery 70 has to be discharged. The battery SOC is calculated by the ECU 200 based on the state of the battery 70.

In Step S12, the ECU 200 sets the sum of the user power demand Preq and the battery power demand PBreq (total power required for the vehicle 1, that is, a "vehicle power demand") to an engine power demand PEreq. Then, the control returns to the flowchart in FIG. 3 in Step S13.

Then, the processing in Step S2 is executed. In Step S2, the rotation speed NEef during the execution of the optimum fuel efficiency control and the rotation speed NEac during the execution of the acceleration feeling production control are calculated as the engine rotation speed command value candidates.

Figure 5:
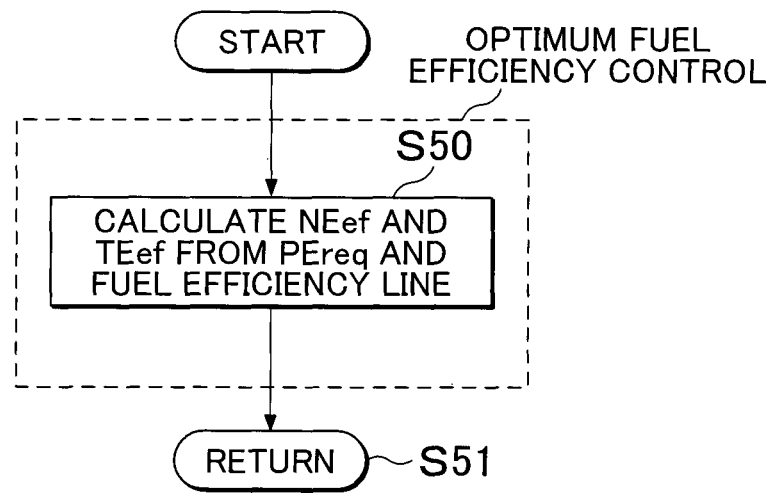
FIG. 5 is a flowchart illustrating a part of the processing in Step S2 in FIG. 3 (part where an engine rotation speed is calculated in a case where the optimum fuel efficiency control for the vehicle is executed: referred to as Step S2A) in detail.

FIG. 5 is a flowchart illustrating a part of the processing in Step S2 in FIG. 3 (part where the rotation speed NEef is calculated: referred to as Step S2A) in detail.

Referring to FIGS. 1 and 5, the ECU 200 sets a command engine operating point through the optimum fuel efficiency control illustrated in Step S50. In this embodiment, the optimum fuel efficiency control is processing in which the command engine operating point is set for the engine 10 to output the engine power demand PEreq with a maximum efficiency.

Specifically, the ECU 200 calculates an optimum engine operating point (the optimum fuel efficiency rotation speed NEef and an optimum fuel efficiency torque TEef) by using the engine power demand PEreq and a fuel efficiency line.

Figure 6:
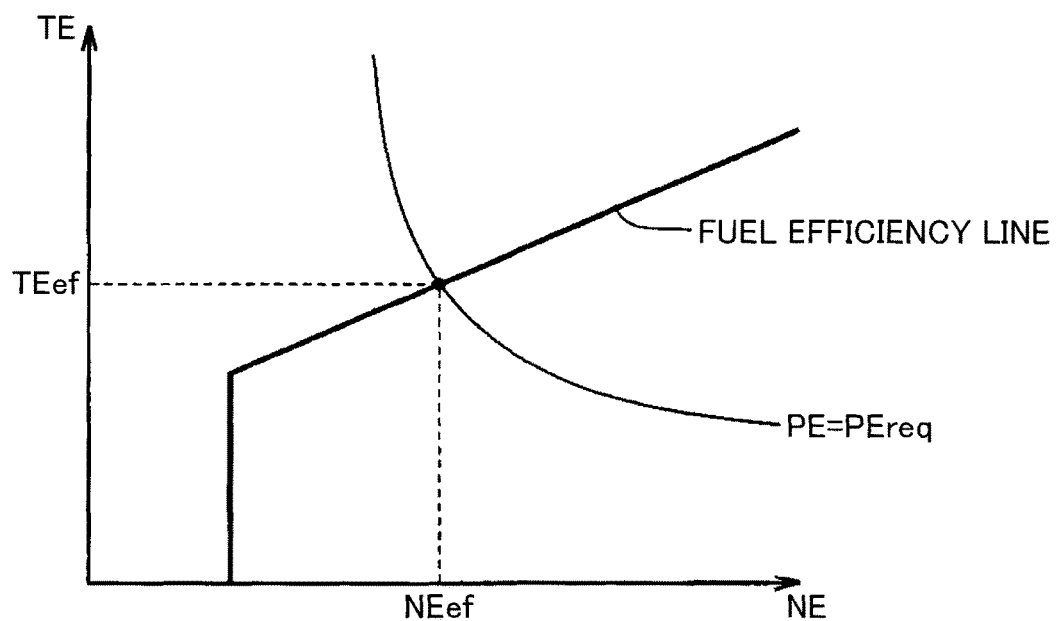
FIG. 6 is a schematic diagram illustrating techniques for calculating an optimum fuel efficiency rotation speed and an optimum fuel efficiency torque by the optimum fuel efficiency control for the vehicle.

FIG. 6 is a schematic diagram illustrating techniques for calculating the optimum fuel efficiency rotation speed NEef and the optimum fuel efficiency torque TEef by the optimum fuel efficiency control. The fuel efficiency line that is illustrated in FIG. 6 is an operation line in which operating points, at which the engine 10 can be operated with a maximum efficiency (that is, with an optimum fuel efficiency), are connected by using the engine rotation speed NE and an engine torque TE as parameters. When the horizontal axis in FIG. 6 is the engine rotation speed NE and the vertical axis in FIG. 6 is the engine torque TE, the fuel efficiency line is a curve that is illustrated in FIG. 6. Engine power PE is obtained by multiplying the engine rotation speed NE by the engine torque TE (PE=NE×TE). A curve where the PE equals to the PEreq (constant) is an inversely proportional curve that is illustrated in FIG. 6.

The ECU 200 calculates the optimum fuel efficiency rotation speed NEef and the optimum fuel efficiency torque TEef from a point of intersection between the curve that shows the fuel efficiency line and the inversely proportional curve where the PE equals to the PEreq. The optimum fuel efficiency rotation speed NEef and the optimum fuel efficiency torque TEef that are calculated in this manner are set to the command engine operating point, and thus the engine 10 can output the engine power demand PEreq with a maximum efficiency.

Figure 7:
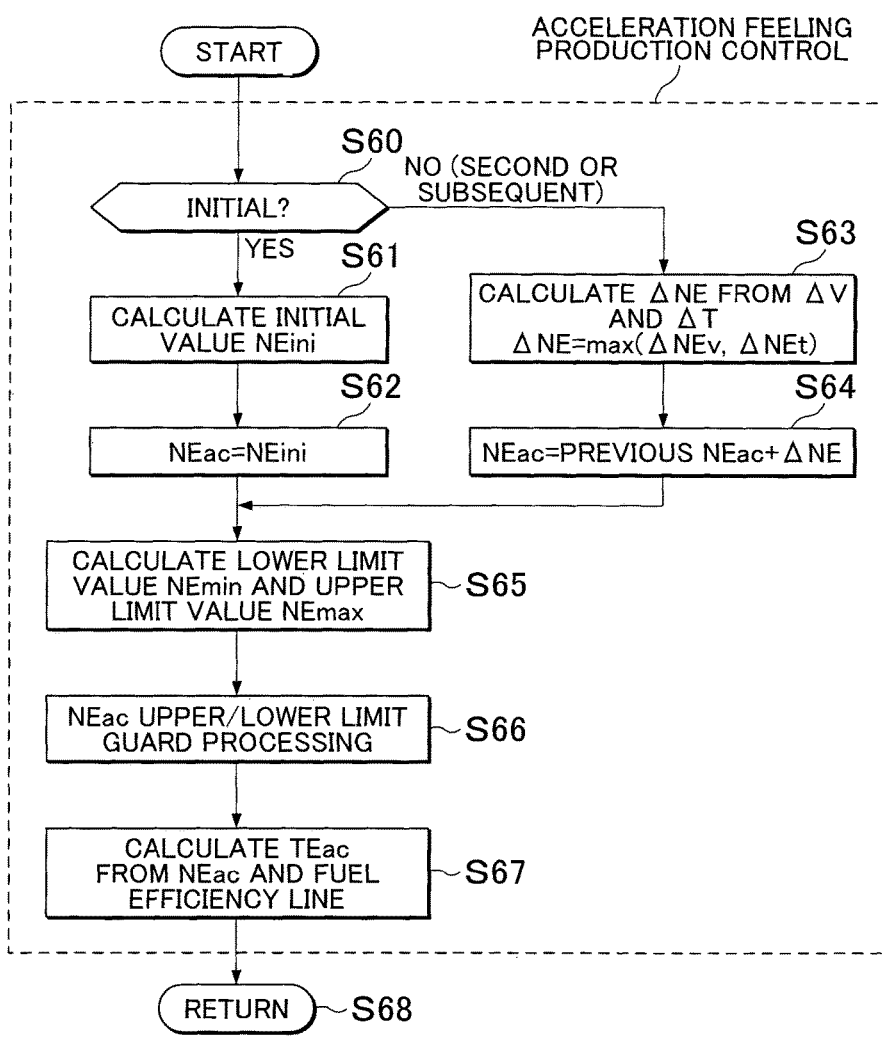
FIG. 7 is a flowchart illustrating another part of the processing in Step S2 in FIG. 3 (part where the engine rotation speed is calculated in a case where the acceleration feeling production control for the vehicle is executed: referred to as Step S2B) in detail.

FIG. 7 is a flowchart illustrating another part of the processing in Step S2 in FIG. 3 (part where the rotation speed NEac is calculated: referred to as Step S2B) in detail. Referring to FIGS. 1 and 7, the ECU 200 sets the command engine operating point through the acceleration feeling production control that is illustrated in Steps S60 to S67. In this embodiment, the acceleration feeling production control is processing for increasing the engine rotation speed NE according to one or each of the passage of time from time points of vehicle speed increase and the acceleration request so as to give the user the acceleration feeling similar to an acceleration feeling of a stepped transmission.

Specifically, the ECU 200 determines in Step S60 whether or not a current cycle is an initial acceleration feeling production control. For example, the ECU 200 determines that the current cycle is the initial acceleration feeling production control in a case where the control throttle opening A of the previous cycle is lower than a predetermined threshold Ath.

In a case where the current cycle is the initial acceleration feeling production control (YES in Step S60), the ECU 200 calculates an initial value NEini of the engine rotation speed in Step S61. The initial value NEini is calculated as a value that is lower than the optimum fuel efficiency rotation speed NEef which is described in Step S50 in FIG. 5. A technique for calculating the initial value NEini will be described in detail later. In Step S62, the ECU 200 sets the initial value NEini to the command engine rotation speed NEac during the execution of the acceleration feeling production control.

In a case where the current cycle is the second or subsequent acceleration feeling production control (NO in Step S60), the ECU 200 calculates the rate of engine rotation speed increase (engine rotation speed increment for elapsed time ΔT) ΔNE in Step S63 based on vehicle speed increment ΔV and the elapsed time (that is, the computation cycle) ΔT between the previous cycle and the current cycle. A technique for calculating the rate of increase ΔNE will be described in detail later.

In Step S64, the ECU 200 calculates a value that is obtained by adding the rate of increase ΔNE, which is calculated in Step S63, to the command engine rotation speed NEac of the previous cycle as the command engine rotation speed NEac of the current cycle as shown by the following formula (a):

$$NEac = \text{Previous-cycle } NEac + \Delta NE \qquad (a)$$

Accordingly, the command engine rotation speed NEac gradually increases at the rate of increase ΔNE during the acceleration feeling production control, and the user can have the acceleration feeling.

After the calculation of the command engine rotation speed NEac in Step S62 or in Step S64, the ECU 200 calculates a lower limit value NEmin and an upper limit value NEmax of the engine rotation speed in Step S65. The lower limit value NEmin and the upper limit value NEmax are values that are used to limit a range of fluctuation of the engine rotation speed NE so as to prevent excessive rotations of the first motor 20 and the power splitting device 40 or prevent excessive charge and excessive discharge of the battery 70.

In Step S66, the ECU 200 performs processing for limiting the command engine rotation speed NEac that is calculated in Step S62 or in Step S64 (hereinafter, also referred to as "upper/lower limit guard processing") by using the lower limit value NEmin and the upper limit value NEmax calculated in Step S65. In the upper/lower limit guard processing, the command engine rotation speed NEac is updated to the lower limit value NEmin in a case where the command engine rotation speed NEac is below the lower limit value NEmin. In a case where the command engine rotation speed NEac exceeds the upper limit value NEmax, the command engine rotation speed NEac is updated to the upper limit value NEmax. In a case where the command engine rotation speed NEac is a value between the lower limit value NEmin and the upper limit value NEmax, an command engine rotation speed NEcom is maintained without any change.

In Step S67, the ECU 200 calculates a command engine torque TEac by using the command engine rotation speed NEac and the fuel efficiency line after the upper/lower limit guard processing.

In Step S68, the control returns to the flowchart in FIG. 3, and the processing in Step S4 is performed.

Figure 8:
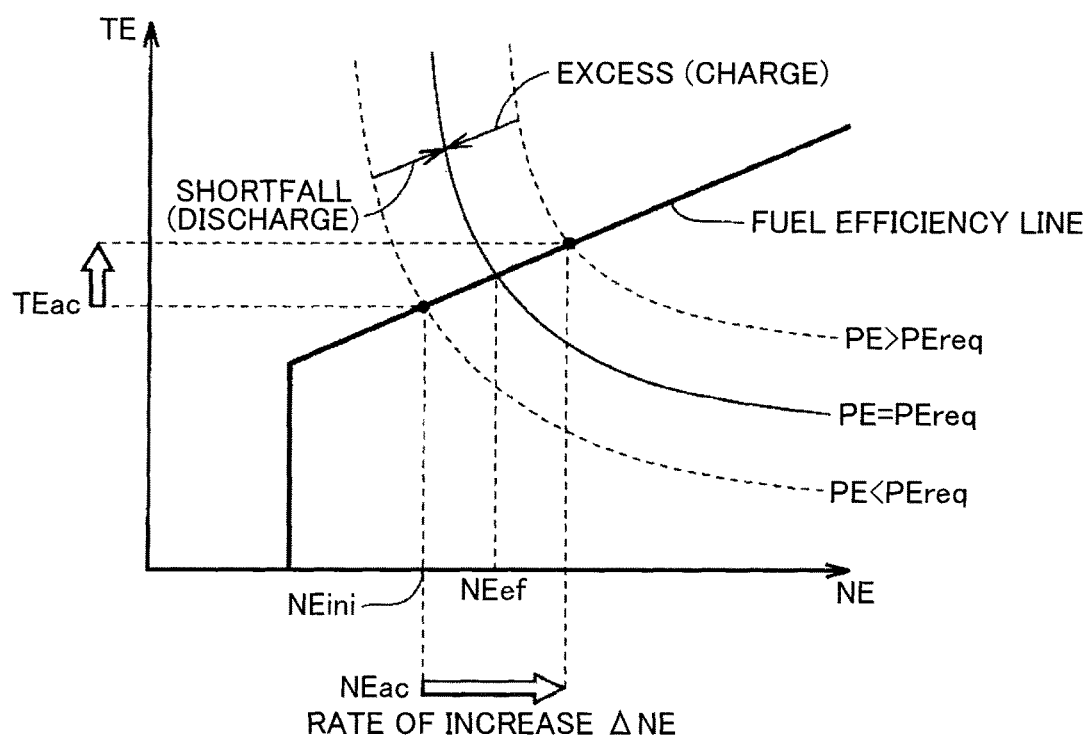
FIG. 8 is a schematic diagram illustrating techniques for setting a command engine rotation speed and a command engine torque by the acceleration feeling production control.

FIG. 8 is a schematic diagram illustrating the techniques for setting the command engine rotation speed NEac and the command engine torque TEac by the acceleration feeling production control.

In the initial acceleration feeling production control, the command engine rotation speed NEac is set to the initial value NEini that is lower than the optimum fuel efficiency rotation speed NEef and the command engine torque TEac corresponding to the initial value NEini is calculated by using the fuel efficiency line. Accordingly, the engine power PE for the initial acceleration feeling production control is a value that is smaller than the engine power demand PEreq.

In the second or subsequent acceleration feeling production control, the command engine rotation speed NEac is increased at the rate of increase ΔNE, and the command engine torque TEac is determined by the command engine rotation speed NEac after the increase and the fuel efficiency line. Accordingly, the engine power PE also gradually increases.

When the command engine rotation speed NEac reaches the optimum fuel efficiency rotation speed NEef, the engine power PE is equal to the engine power demand PEreq.

Then, the command engine rotation speed NEac further increases to exceed the optimum fuel efficiency rotation speed NEef. In this case, the engine power PE is a value that is higher than the engine power demand PEreq.

As the acceleration feeling production control is performed in this manner, the engine power PE may become short of or exceed the engine power demand PEreq. This excess or shortfall is corrected by the output of the second motor 30 in the processing in Step S70 in FIG. 14 (described later), and thus the user-requested vehicle driving force can be achieved.

After the calculation of the engine rotation speed command value candidates NEef and NEac in Step S2 in FIG. 3, the command value is determined as any one of the command value candidates in Step S3.

Figure 9:
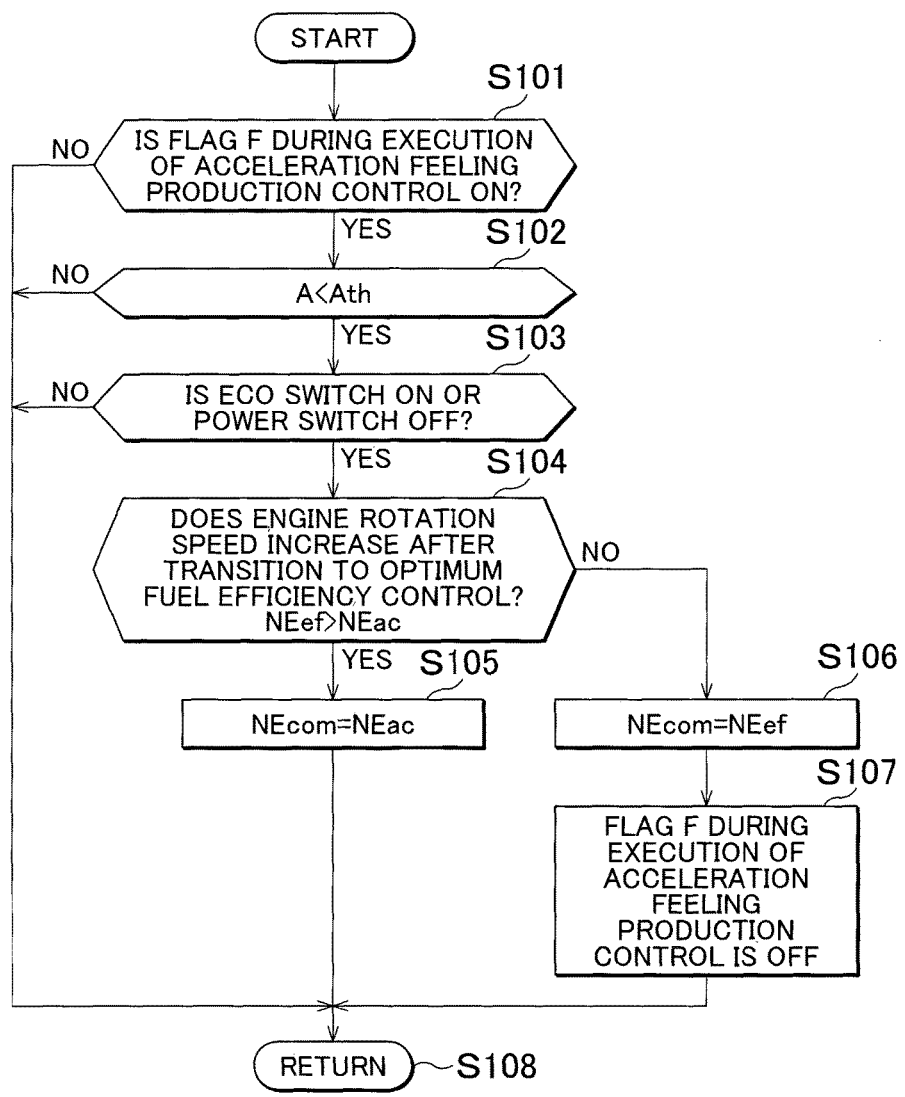
FIG. 9 is a flowchart that is used to describe a part of the processing in Step S3 in FIG. 3 (during the execution of the acceleration feeling production control: referred to as Step S3A)

FIG. 9 is a flowchart that is used to describe a part of the processing in Step S3 (during the execution of the acceleration feeling production control). Referring to FIGS. 1 and 9, it is determined in Step S101 whether or not a flag F is in an ON state during the execution of the acceleration feeling production control. The flag F during the execution of the acceleration feeling production control is one of control flags that are stored within the ECU 200. The F is set ON during the execution of the acceleration feeling production control and the F is set OFF during non-execution of the acceleration feeling production control.

In a case where the F is OFF in Step S101, the processing proceeds to Step S108. In a case where the F is ON in Step S101, the processing proceeds to Step S102. In Step S102, a comparison is performed between the control throttle opening A and the predetermined threshold Ath determined to execute the acceleration feeling production control. In a case where A<Ath is not satisfied in Step S102, the state during the execution of the acceleration feeling production control is maintained, and the processing proceeds to Step S108. In a case where A<Ath is satisfied in Step S102, a possibility of transition from the acceleration feeling production control to the optimum fuel efficiency control is present, and the processing proceeds to Step S103.

In Step S103, it is determined whether or not the eco-switch 201 is in an ON state or the power switch 202 is in an OFF state.

FIG. 10 is a diagram that is used to describe a state where the control throttle opening A is changed to exceed the predetermined threshold Ath and the acceleration feeling production control is canceled by an operation of a mode-switching switch. Referring to FIG. 10, the horizontal axis in FIG. 10 represents a user's accelerator operation amount Au and the vertical axis in FIG. 10 represents the control throttle opening A. The user's accelerator operation amount Au is the accelerator pedal operation by the user detected by the accelerator operation amount sensor 203. In contrast, the control throttle opening A is a parameter that is used by the ECU 200 for vehicle power calculation. The control throttle opening A is set to the dashed-line characteristics illustrated as NORM in a normal mode, is set to the solid-line characteristics illustrated as ECO in an eco mode, and is set to the solid-line characteristics illustrated as POWER in a power mode.

As illustrated by the arrow in the drawing, the control throttle opening A may be changed from above the predetermined threshold Ath to below the predetermined threshold Ath when the eco mode is set by the eco-switch 201 or the power mode is canceled by the power switch 202.

Figure 11:
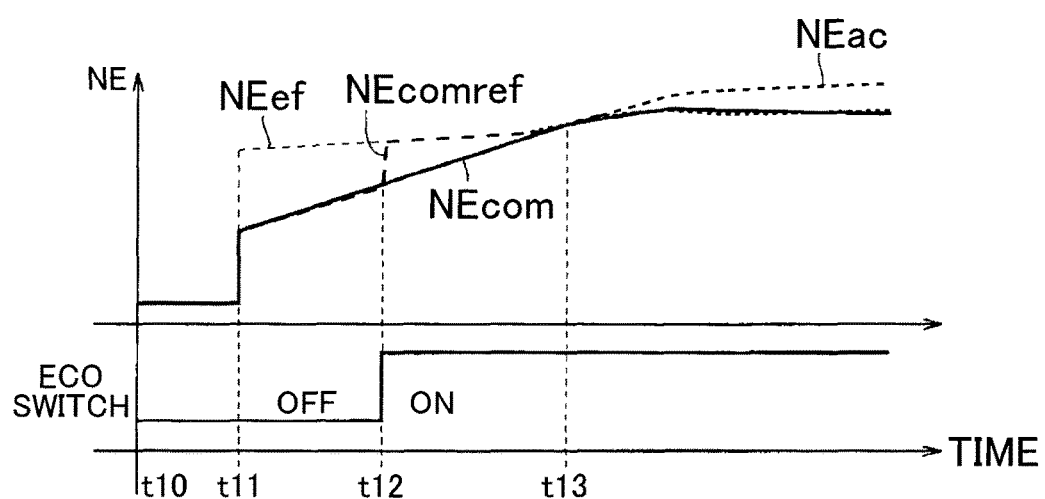
FIG. 11 is a waveform chart that is used to describe an engine rotation speed change in a case where an eco mode is set by an eco-switch according to this embodiment.
Figure 12:
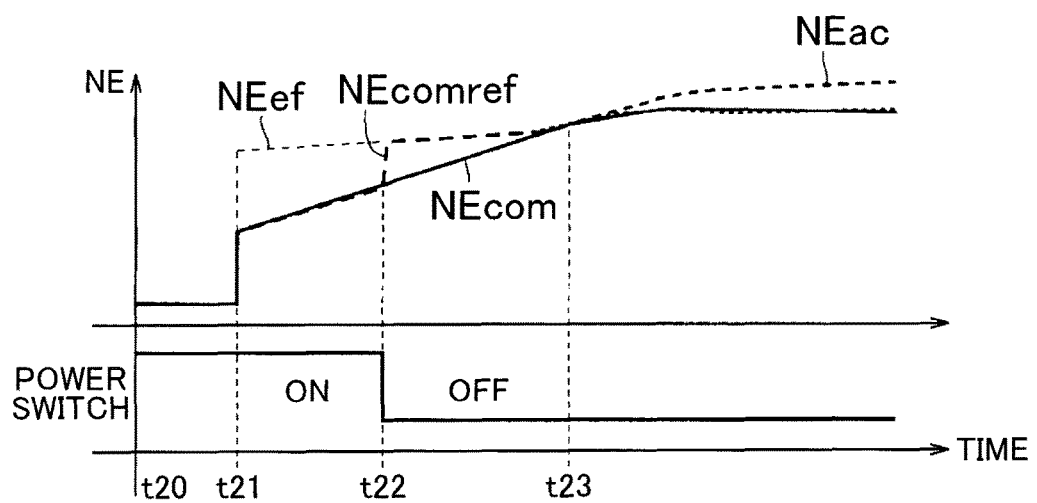
FIG. 12 is a waveform chart that is used to describe an engine rotation speed change in a case where power mode setting is canceled by a power switch according to this embodiment.

FIG. 11 is a waveform chart that is used to describe the engine rotation speed change in a case where the eco mode is set by the eco-switch. FIG. 12 is a waveform chart that is used to describe the engine rotation speed change in a case where the power mode setting is canceled by the power switch.

As illustrated by times t12 and t22 in FIGS. 11 and 12, the engine rotation speed suddenly increases immediately after the cancel of the acceleration feeling production control and the transition to the optimum fuel efficiency control in response to the change of the control throttle opening A across the predetermined threshold Ath. In a case where the eco mode is set or the power mode is canceled, the user feels a sense of discomfort after the engine rotation speed rises. In this embodiment, the flag F is not immediately set OFF during the execution of the acceleration feeling production control even if A≥Ath is satisfied in Step S102 in FIG. 9.

Referring back to FIG. 9, the processing proceeds to Step S104 in a case where the ECO switch is in an ON state or the power switch is in an OFF state in Step S103. In Step S104, it is determined whether or not the engine rotation speed rises when the transition is made from the acceleration feeling production control to the optimum fuel efficiency control. Specifically, it is determined whether or not NEef>NEac is satisfied between the engine rotation speed command value candidates NEef and NEac that are calculated in Step S2 in FIG. 3.

The processing proceeds to Step S105 if NEef>NEac is satisfied in Step S104. Then, the NEac is selected as the engine rotation speed command value NEcom.

In a case where the NEef>NEac is not satisfied in Step S104, that is, in a case where the NEac reaches the NEef in Step S104, the processing proceeds to Step S106. Then, the NEef is selected as the engine rotation speed command value NEcom.

Then, the flag F is set OFF during the execution of the acceleration feeling production control in Step S107.

Through the control described above, any sudden rise in the engine rotation speed command value NEcom is prevented at times t12 and t22 as in an NEcomref of a study example as illustrated in FIGS. 11 and 12. Accordingly, the transition from the acceleration feeling production control to the optimum fuel efficiency control can be performed, without the user feeling the sense of discomfort, even when the control throttle opening A is changed across the predetermined threshold Ath by the operations of the eco-switch 201 and the power switch 202.

Figure 13:
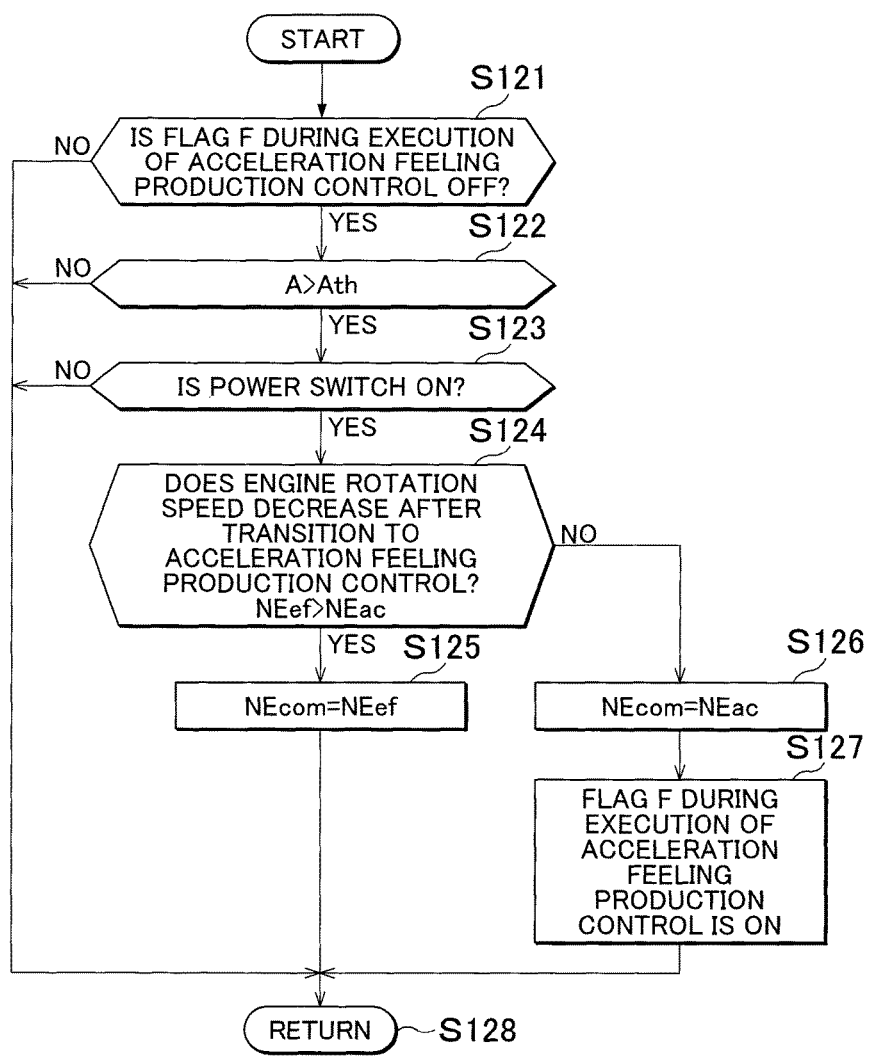
FIG. 13 is a flowchart that is used to describe another part of the processing in Step S3 in FIG. 3 (during non-execution of the acceleration feeling production control: referred to as Step S3B)

FIG. 13 is a flowchart that is used to describe another part of the processing in Step S3 (during the non-execution of the acceleration feeling production control). Referring to FIGS. 1 and 13, it is determined in Step S121 whether or not the flag F is in an OFF state during the execution of the acceleration feeling production control.

In a case where the F is ON in Step S121, the processing proceeds to Step S128. In a case where the F is OFF in Step S121, the processing proceeds to Step S122. In Step S122, a comparison is performed between the control throttle opening A and the predetermined threshold Ath determined to execute the acceleration feeling production control. In a case where A>Ath is not satisfied in Step S122, the state during the non-execution of the acceleration feeling production control is maintained, and the processing proceeds to Step S128. In a case where A>Ath is satisfied in Step S122, a possibility of transition from the optimum fuel efficiency control to the acceleration feeling production control is present, and the processing proceeds to Step S123.

Figure 14:
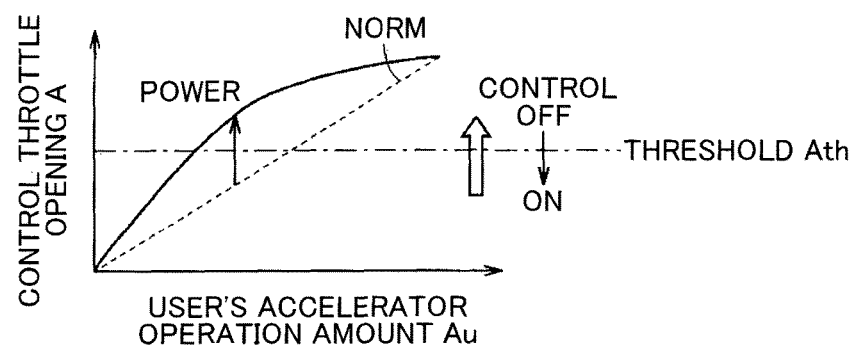
FIG. 14 is a diagram that is used to describe a state where the control throttle opening is changed to exceed the predetermined threshold and the acceleration feeling production control is executed by an operation of a mode-switching switch according to this embodiment.

In Step S123, it is determined whether or not the power switch 202 is in an ON state. FIG. 14 is a diagram that is used to describe a state where the control throttle opening is changed to exceed the predetermined threshold and the acceleration feeling production control is executed by the operation of the mode-switching switch. Referring to FIG. 14, the horizontal axis in FIG. 14 represents the user's accelerator operation amount Au and the vertical axis in FIG. 14 represents the control throttle opening A. The control throttle opening A is set to the dashed-line characteristics illustrated as NORM in the normal mode, and is set to the solid-line characteristics illustrated as POWER in the power mode.

As illustrated by the arrow in the drawing, the control throttle opening A may be changed from below the predetermined threshold Ath to above the predetermined threshold Ath when the power mode is set by the power switch 202.

Figure 15:
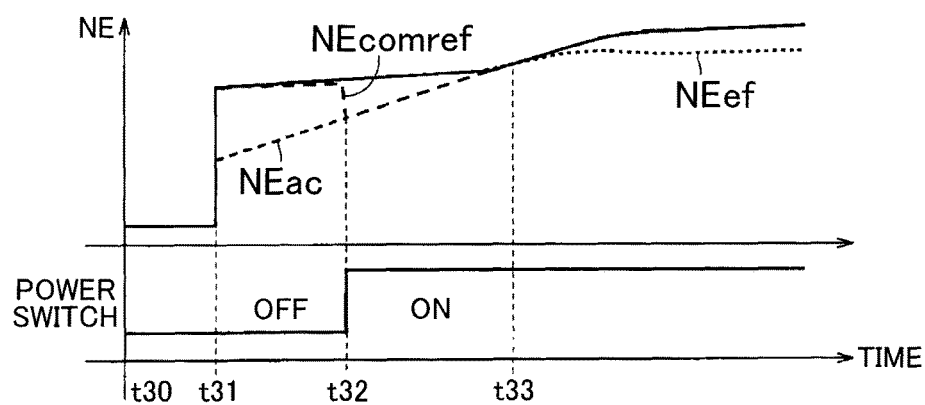
FIG. 15 is a waveform chart that is used to describe an engine rotation speed change in a case where a power mode is set by the power switch according to this embodiment.

FIG. 15 is a waveform chart that is used to describe the engine rotation speed change in a case where the power mode is set by the power switch.

As illustrated by time t32 in FIG. 15, the engine rotation speed suddenly decreases immediately after the transition from the optimum fuel efficiency control to the acceleration feeling production control in response to the change of the control throttle opening A across the predetermined threshold Ath. In a case where the power mode is set, the user feels the sense of discomfort after the engine rotation speed decreases. In this embodiment, the flag F is not immediately set ON during the execution of the acceleration feeling production control even if A>Ath is satisfied in Step S122 in FIG. 13.

Referring back to FIG. 13, the processing proceeds to Step S124 in a case where the power switch is in an ON state in Step S123. In Step S124, it is determined whether or not the engine rotation speed decreases when the transition is made from the optimum fuel efficiency control to the acceleration feeling production control. Specifically, it is determined whether or not NEef>NEac is satisfied between the engine rotation speed command value candidates NEef and NEac that are calculated in Step S2 in FIG. 3.

The processing proceeds to Step S125 if NEef>NEac is satisfied in Step S124. Then, the NEef is selected as the engine rotation speed command value NEcom.

In a case where the NEef>NEac is not satisfied in Step S124, that is, in a case where the NEac reaches the NEef in Step S124, the processing proceeds to Step S126. Then, the NEac is selected as the engine rotation speed command value NEcom.

Then, the flag F is set ON during the execution of the acceleration feeling production control in Step S127.

Through the control described above, any sudden decrease in the engine rotation speed command value NEcom is prevented at time t32 as in the NEcomref of the study example as illustrated in FIG. 15. Accordingly, the transition from the optimum fuel efficiency control to the acceleration feeling production control can be performed, without the user feeling the sense of discomfort, even when the control throttle opening A is changed across the predetermined threshold Ath by the operation of the power switch 202.

After the command engine operating point is set through the processing in Step S3 in FIG. 3 as described above, the ECU 200 executes motor control command value calculation processing in Step S4.

Figure 16:
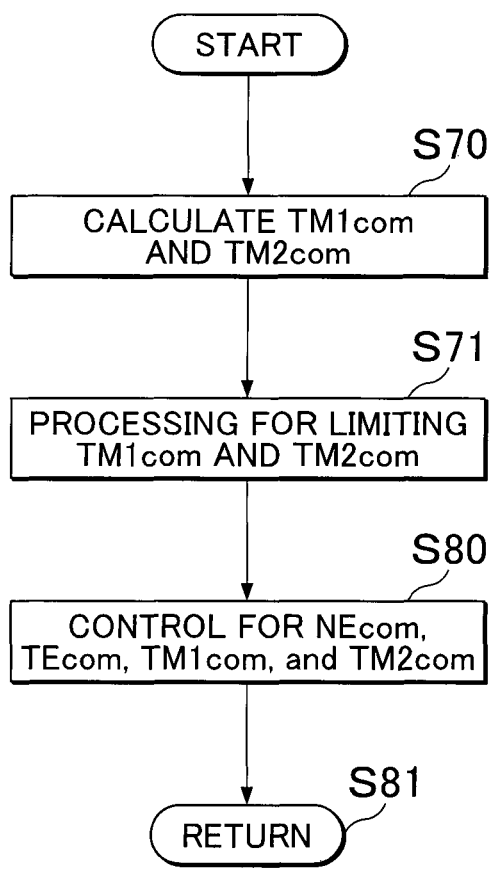
FIG. 16 is a flowchart illustrating the processing in Step S4 in FIG. 3 in detail.

FIG. 16 is a flowchart illustrating the processing in Step S4 in FIG. 3 in detail. The engine power PE is the engine power demand PEreq during the optimum fuel efficiency control (refer to FIG. 8). The engine power PE is may be short of or exceed the engine power demand PEreq during the acceleration feeling production control (refer to FIG. 8). In the processing in Step S70 in FIG. 16, a second motor command torque TM2com is calculated so that the excess or the shortfall is corrected by the second motor output (powering power or regenerative power).

In Step S71, the ECU 200 determines whether or not temperatures detected by temperature detection sensors of the MG1 and MG2 exceed a predetermined threshold temperature Tth. The ECU 200 limits loads on the MG1 and MG2 when temperature of the MG1 or the MG2 exceeds a predetermined threshold temperature Tth. This processing is a load factor limiting processing that is executed to prevent overheating of the first motor 20 and the second motor 30. In Step S71, a TM1com and the TM2com are limited if necessary. Then, the ECU 200 allows the processing to proceed to Step S80.

In Step S80, the ECU 200 controls an intake air amount, a fuel injection amount, an ignition timing, an intake valve opening/closing timing, and the like for the engine 10 so that the engine 10 is operated at the operating point having the command engine rotation speed NEcom and the command engine torque TEcom. Also, the ECU 200 controls the PCU 60 so that the first motor 20 outputs the first motor command torque TM1com and the second motor 30 outputs the second motor command torque TM2com.

When the control that is described in this embodiment is performed as described above, the engine rotation speed change is suppressed and the driver can avoid the sense of discomfort in a case where the command engine rotation speed for the acceleration feeling production control and the command engine rotation speed for the optimum fuel efficiency control deviate from each other.

An example in which both the processing (processing in the flowchart in FIG. 9) for suppressing the sudden rise in the engine rotation speed during the transition from the acceleration feeling production control to the optimum fuel efficiency control and the processing (processing in the flowchart in FIG. 13) for suppressing the sudden decrease in the engine rotation speed during the transition from the optimum fuel efficiency control to the acceleration feeling production control are executed has been described in this embodiment. However, only one of the processing may be applied as well.

This embodiment will be summarized referring back to FIG. 1. The vehicle 1 according to this embodiment is a vehicle that is capable of traveling by using the power of at least any one of the engine 10 and the motor 30, and is provided with the continuously variable transmission device (realized by the first motor 20 and the power splitting device 40) which are disposed between the engine 10 and the drive wheels 80 and the electric control unit 200 which is configured as the electronic control unit (ECU) controlling the engine 10, the motor 30, and the continuously variable transmission device. The electric control unit 200 selects any one of a plurality of operation modes (FIG. 10: eco mode, normal mode, and power mode), which have different correlations between the driver' accelerator operation amount Au and the control throttle opening A, to suit driver's requests. In a case where the control throttle opening A exceeds the predetermined threshold Ath, the electric control unit 200 performs the number-of-revolutions increase control for increasing the engine rotation speed according to one or each of the passage of time from the time points (t1 in FIG. 2) of the vehicle speed increase and the acceleration request. In a case where the control throttle opening A is changed across the predetermined threshold Ath due to a change of the operation mode, the electric control unit 200 controls the engine 10 so as to suppress the engine rotation speed change attributable to the operation mode change.

According to this configuration, the sense of discomfort, such as the sudden change in the engine rotation speed, is suppressed when the mode switching operation is performed by the driver in the vehicle which allows the execution of the number-of-revolutions increase control.

In a case where the control throttle opening A does not exceed the predetermined threshold Ath in the above-described vehicle, the electric control unit 200 executes a fuel efficiency-priority engine control for focusing on fuel efficiency improvement more than the number-of-revolutions increase control. In a case where the control throttle opening A is changed across the predetermined threshold Ath in response to the change of the operation mode, the electric control unit may put control switching between the number-of-revolutions increase control and the fuel efficiency-priority engine control on hold and execute the control switching in a case where the engine rotation speed which is determined by the number-of-revolutions increase control and the engine rotation speed which is determined by the fuel efficiency-priority engine control are identical to each other (FIG. 11, t13; FIG. 12, t23; FIG. 15; t33).

When the mode switching operation is performed by the driver in the vehicle allowing the execution of the number-of-revolutions increase control, the engine rotation speed can be smoothly changed, despite the mode change, according to this configuration since the switch is performed after a state where the engine rotation speed is not suddenly changed. In other words, the control switching between the number-of-revolutions increase control and the fuel efficiency-priority engine control can be performed without the driver feeling the sense of discomfort.

The plurality of operation modes may include a fuel efficiency-priority mode. In the above-described vehicle, the electric control unit may select the engine rotation speed that is determined by the number-of-revolutions increase control as the engine rotation speed command value in a case where the control throttle opening A is changed across the predetermined threshold Ath in response to the change of the operation mode to the fuel efficiency-priority mode in a state where the engine rotation speed during the execution of the number-of-revolutions increase control is lower than the engine rotation speed determined by the fuel efficiency-priority engine control (FIG. 11, t12 to t13; FIG. 12, t22 to t23).

For example, the normal mode and the eco mode in comparison to the power mode correspond to the fuel efficiency-priority mode and the eco mode in comparison to the normal mode corresponds to the fuel efficiency-priority mode. According to this configuration, the engine rotation speed change is suppressed and the driver can avoid the sense of discomfort in a case where the engine rotation speed may be suddenly increased by the mode switch by the driver to the fuel efficiency-priority mode.

The plurality of operation modes may include the fuel efficiency-priority mode. In the above-described vehicle, the electric control unit may select the engine rotation speed that is determined by the fuel efficiency-priority engine control as the engine rotation speed command value in a case where the control throttle opening A is changed across the predetermined threshold Ath by the cancel of the fuel efficiency-priority mode in a state where the engine rotation speed during the execution of the fuel efficiency-priority engine control is higher than the engine rotation speed determined by the number-of-revolutions increase control (FIG. 15, t32 to t33).

It should be noted that the embodiment disclosed herein is illustrative and not limiting in any aspect. The scope of the invention is clarified not by the above description but by the scope of claims, and the invention is intended to include any modification within the meaning and scope equal to the scope of claims.

The invention claimed is:

1. A vehicle capable of traveling by using power of an engine and a motor generator, the vehicle comprising:
   a continuously variable transmission device provided between the engine and drive wheels of the vehicle; and
   an electronic control unit configured to:
   (a) control the engine, the motor generator, and the continuously variable transmission device,
   (b) select any one of a plurality of operation modes to suit driver's requests, the plurality of operation modes having different correlations between a driver's accelerator operation amount for the vehicle and a control throttle opening of the vehicle,
   (c) perform a number-of-revolutions increase control for increasing a rotation speed of the engine according to at least one of elapsed time from a time point of a vehicle speed increase or elapsed time from a time point of an acceleration request, in a case where the control throttle opening exceeds a predetermined threshold, and
   (d) suppress a change in the rotation speed of the engine due to a change of the operation mode, in a case where the control throttle opening is changed across the predetermined threshold in response to the change of the operation mode.

2. The vehicle according to claim 1, wherein
   the electronic control unit is configured to execute a fuel efficiency-priority engine control for focusing on fuel efficiency improvement more than the number-of-revolutions increase control, in a case where the control throttle opening does not exceed the predetermined threshold,
   the electronic control unit is configured to put control switching between the number-of-revolutions increase control and the fuel efficiency-priority engine control on hold, in a case where the control throttle opening is changed across the predetermined threshold in response to the change of the operation mode, and
   the electronic control unit is configured to execute the control switching when the rotation speed of the engine determined by the number-of-revolutions increase control and the rotation speed of the engine determined by the fuel efficiency-priority engine control are identical to each other, in a case where the control throttle opening is changed across the predetermined threshold in response to the change of the operation mode.

3. The vehicle according to claim 2, wherein
   the plurality of operation modes include a fuel efficiency-priority mode, and
   the electronic control unit is configured to select the rotation speed of the engine determined by the number-of-revolutions increase control as a rotation speed command value for the engine, in a case where the control throttle opening is changed across the predetermined threshold in response to the change of the operation mode to the fuel efficiency-priority mode in a state where the rotation speed of the engine during the execution of the number-of-revolutions increase control is lower than the rotation speed of the engine determined by the fuel efficiency-priority engine control.

4. The vehicle according to claim 2, wherein
   the plurality of operation modes include a fuel efficiency-priority mode, and
   the electronic control unit is configured to select the rotation speed of the engine determined by the fuel efficiency-priority engine control as a rotation speed command value for the engine, in a case where the control throttle opening is changed across the predetermined threshold by cancel of the fuel efficiency-priority mode in a state where the rotation speed of the engine during the execution of the fuel efficiency-priority engine control is higher than the rotation speed of the engine determined by the number-of-revolutions increase control.

5. The vehicle according to claim 1, wherein
   the continuously variable transmission device includes another motor generator other than the motor generator, and
   the electronic control unit is configured to execute control for satisfying a power demand by power absorption or output by the another motor generator, in a case where an excess or a shortfall is produced with respect to a driver's power demand during the number-of-revolutions increase control.

6. The vehicle according to claim 5, wherein
   each of the motor generator and the another motor generator is provided with a temperature detection sensor, and
   the electronic control unit is configured to limit loads on the motor generator and the another motor generator when temperature of the motor generator or the another motor generator detected by at least one of the temperature detection sensors exceeds a predetermined threshold temperature.

7. The vehicle according to claim 5, wherein
   the electronic control unit is configured suppress the change in the rotation speed of the engine due to the change of the operation mode by adjusting a rotation speed of the another motor generator, in the case where the control throttle opening is changed across the predetermined threshold in response to the change of the operation mode.

* * * * *